3,748,320
PROCESS FOR THE PREPARATION OF
PYRIMIDINE NUCLEOSIDES
Helmut Vorbrüggen and Ulrich Niedballa, Berlin, Germany, assignors to Schering AG., Berlin, Germany
No Drawing. Filed Apr. 8, 1970, Ser. No. 26,783
Claims priority, application Germany, Apr. 11, 1969,
P 19 19 307.8; Aug. 23, 1969, P 19 43 428.7
Int. Cl. C07d 51/52
U.S. Cl. 260—211.5 R   11 Claims

ABSTRACT OF THE DISCLOSURE

An improved process for producing pyrimidine nucleosides of the formula

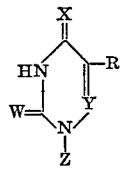

wherein R is H, lower-alkyl, —NO$_2$ or C≡N, W is O or S, X is O or =N—B in which B is H, alkyl, aryl or aralkyl and Z is a masked sugar residue, having cytotoxic, antiviral, enzyme-inhibiting, immunosuppressive, anti-inflammatory and anti-psoriatic activity, by reacting a 1-O-acyl, 1-O-alkyl or 1-halo sugar whose free hydroxy groups are blocked by ether and/or ester groups with a pyrimidine derivative of the formula

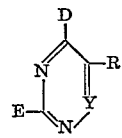

wherein R and Y have the values given above, D is a silyl or alkyl ether group or a group of the formula (alkyl) Si-NB or alkyl-NB wherein B has the value given above, using SnCl$_4$, TiCl$_4$, ZnCl$_2$, BF$_3$ (etherate), AlCl$_3$ or FeCl$_3$ as the reaction catalyst.

BACKGROUND OF THE INVENTION

This invention relates to an improved method for the preparation of pyrimidine nucleosides.

It is known that nucleosides can be produced from masked 1-halogen sugars and O-silyl, S-silyl, O-alkyl or S-alkyl pyrimidines in the presence of mercury(II) salts, e.g., mercury(II) acetate, mercury(II) chloride or mercury(II) bromide. See "Chem. Ber." 101, 1059 (1968). However, the use of mercury salts has the disadvantage that the reaction is very slow at room temperature and if the reactants are heated in an organic solvent, considerable decomposition occurs. Thus, sensitive nucleosides cannot be prepared by this method or only in poor yields. Also, the use of mercury salts in the reaction has the disadvantage that the mercury salts contaminate the thus-prepared reaction products and can be removed therefrom only by expensive purification operations.

SUMMARY OF THE INVENTION

According to this invention, pyrimidine nucleosides are prepared by reacting a 1-O-acyl, 1-O-alkyl, or 1-halogen sugar, the hydroxy groups of which are protected by blocking groups, with an O-, S-, N-silyl or -alkyl pyrimidine derivatives as defined herein, in the presence of tin tetrachloride, titanium tetrachloride, zinc chloride or boron trifluoride, AlCl$_3$ or FeCl$_3$ as Friedel-Crafts catalysts.

The problems associated with the use of mercury salts are thus avoided. Moreover, higher yields are obtained.

Also, in addition to masked 1-halogen sugars, 1-O-acyl or 1-O-alkyl derivatives of the masked sugars can be employed in the process.

DETAILED DISCUSSION

Preferred starting compounds for the process of this invention are pyrimidines of the general Formula IIa:

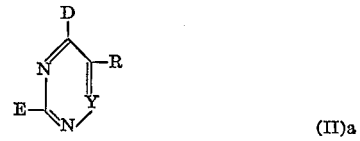

wherein R is a hydrogen atom, lower-alkyl group, i.e., containing 1–4 carbon atoms, a halogen atom, i.e., Cl, Br, F, I, a nitro group or nitrile group; E is a silylated or alkylated, preferably lower-alkylated, —O- or —S- group, i.e., a silyl or alkyl ether or thioether group; D is a silylated or alkylated —O-, i.e., ether, group or the silylated or alkylated group —N—B wherein B is a hydrogen atom or an alkyl, aryl, or aralkyl group, e.g., lower-alkyl, including CH$_3$ and C$_2$H$_5$, and Y is a nitrogen atom or the group CH.

The silylated pyrimidines employed as starting materials can be produced employing conditions described in: Silylation of Organic Compounds, Pierce Chemical Company, Rockford, Ill., 1968, pp. 18–26 and in Chem. Pharm. Bull. 12 (1964) 352 and Z. Chem. 4 (1964) 303.

Preferred specific silylation reactants include for example trimethylchlorosilane with bases as pyridine, triethylamine or other tertiary amines, or with ammonia; hexamethyldisilazane with an acid catalyst as trimethylchlorosilane, ammonium salts, sodium bisulfate; N-silylated amines like trimethyl silylmethylamine, trimethylsilylaniline, trimethylsilyldiethylamine, trimethylsilylimidazole, silylated amides like N, O-bistrimethylsilylacetamide, N-trimethylsilyl-N, N'-diphenylurea and N-trimethylsilylphthalimide.

Examples of silylated starting compounds employed in the process of this invention are those of Formula IIb:

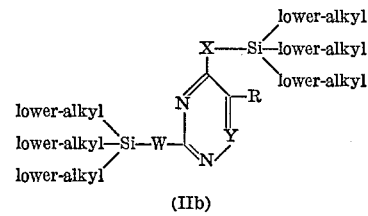

wherein W is —S— or —O— and R and Y have the values given above.

Of the above starting materials, especially preferred are the following classes:

(a) The lower-alkyl groups of the silyl moieties is methyl;
(b) X at the 4-position is O and NB;
(c) Y is CH and N;
(d) R is CH$_3$, C$_2$H$_5$, C≡N, nitro and I;
(e) W at the 2-position is O and S; and
(f) Combinations of each of the above.

Many silyl derivatives of pyrimidines are known, e.g., the bis-silyl derivatives of uracil, azauracil, 5-ethyl-uracil, thiouracil. These compounds are obtained by reacting the pyrimidines with hexa-alkyl, preferably hexa-lower-alkyl, disilazanes, such as, for example, hexamethyldisilazane, or with trialkyl, preferably tri-lower-alkyl, siliyl halogenides, especially trimethylsilyl chloride. Of the starting compounds, the bis-trimethylsilyl ethers are preferred.

The 4-N-silyl compounds are prepared in analogy to the corresponding 4-O-silyl compounds.

Preferred specific silyl compounds other than those set forth in the examples include:

2-trimethylsilyl-thio-4-trimethylsilyloxy-5-carboxy-ethyl-pyrimidine,
2-trimethylsilyl-thio-4-trimethylsilylamino-pyrimidine,
2-trimethylsilylthio-4-trimethylsilyloxy-5-ethoxypyrimidine,
2-trimethylsilylthio-4-trimethylsilyloxy-5-propylpyrimidine,
2-trimethylsilyloxy-4-trimethylsilyl-methylamino-pyrimidine,
2-trimethylsilyloxy-4-trimethylsilyl-benzylamino-pyrimidine,
2-trimethylsilyloxy-4-trimethylsilyl-phenyl-amino-pyrimidine,
2-trimethylsilylthio-4-trimethylsilyl-methylamino-pyrimidine,
2-trimethylsilyloxy-4-dimethylamino-pyrimidine.

In addition to silylated pyrimidines, alkylated pyrimidines can be employed as starting materials, e.g., compounds of Formula IIa wherein D and E each are alkyl-O-, alkyl-S-, or alkyl-NB preferably $CH_3$-O- or $CH_3$-S-. These are known classes of compounds which can be prepared by known procedures.

For procedures for preparation of pyrimidines, see: The Chemistry of Heterocyclic Compounds/The Pyrimidines, J. Wiley & Sons, 1962, and 3-thio-1,2,4-triazines, prepared by the methods described in: The Chemistry of Heterocyclic Compounds/The 1,2,3- and 1,2,4-Triazines, Tetrazines and Pentazines, Interscience Publishers, Inc., New York, 1956, pp. 78–84 and in Coll. Czech. Chem. Commun. 24 (1959) 2986.

The sugar reactants employed in the process of this invention are those having in the 1-position a halogen atom, e.g., Cl, a carboxy-ester group or an O-ether group. Examples of such reactants are those in which the sugar moiety is ribose, 2-deoxyribose, glucose, arabinose, allose, fructose, galactose, galactosamine, mannose, rhamnose, sorbose, xylose, glucosamine.

Sugar moieties of particular importance are those of ribose, deoxyribose, arabinose, and glucose. Desirably, all the free hydroxy groups of the sugar moieties are masked. Suitable sugar masking groups are the blocking groups conventionally employed in sugar chemistry, including ester and ether groups, such as, for example, acetyl and other alkanoyl groups, benzoyl and other aroyl groups, e.g., p-chlorobenzoyl, p-nitrobenzoyl and p-toluyl, and cleavable ether groups, e.g., a benzyl group.

The method of preparing the halogenated blocked sugars is conventional, e.g., reacting the sugar with an alcohol in the presence of acid, protecting the free OH-groups with a suitable blocking group and forming the halogen-sugar by treatment with anhydrous hydrogen halide in an organic solvent, e.g., ether, acetic acid.

The protected halogenosugars are prepared by the methods, described in W. W. Zorbach, R. S. Tipson: Synthetic Procedures in Nucleic Acid Chemistry, vol. 1, Interscience Publishers, 1968, or see in Advances in Carbohydrate Chemistry, vol. 10 Academic Press, p. 247–249, 251–253, 1955.

Examples of halogenated blocked sugars are:

2,3,5,6-tetra-O-benzoyl-D-allosylchloride,
2,3,5-tri-O-benzoyl-D-arabinosylbromide,
tetra-O-acetyl-β-D-fructopyranosylchloride,
tetra-O-acetyl-D-fructofuranosylchloride,
tetra-O-acetyl-β-D-galactofuranosylchloride,
tetra-O-acetyl-α-D-galactopyranosylchloride,
2,3,4,6-tetra-O-acetyl-glucopyranosylchloride,
2,3,5,6-tetra-O-acetyl-glucofuranosylchloride,
2,3,4,6-tetra-O-acetyl-α-D-mannopyranosylchloride,
2,3,4-tri-O-benzoyl-rhamnopyranosylchloride,
1,3,4,5-tetra-O-acetyl-sorbopyranosylchloride,
2,3,4-tri-O-acetyl-xylopyranosylchloride.

Suitable reaction solvents include methylene chloride, ethylene chloride, acetonitrile, dioxane, tetrahydrofuran, dimethylformamide, benzene, toluene, carbon disulfide, carbon tetrachloride, tetrachloroethane, chlorobenzene, chloroform and ethyl acetate.

The reaction can be conducted at room temperature or at higher or lower temperatures, e.g., 0–150° C. Generally, the reactants are employed in approximately equimolar amounts. However, it is sometimes advantageous to employ the pyrimidine compound in a minor molar excess in order to obtain as quantitative as possible conversion of the sugar component.

The Friedel-Crafts catalysts employed as catalysts in the process of this invention exhibit the great advantage over the previously utilized mercury (II) salts that they can be removed from the reaction products readily and quantitatively, because the hydrolysis products thereof are insoluble in organic solvents and can easily be separated by washing or filtration.

The yields of the novel reaction are higher than in the processes known heretofore; moreover, surprisingly the β-derivatives of the sugars are predominantly produced, whereas the undesired α-anomers either are formed only in subordinate amounts or not at all.

Examples of the final products produced according to the process of this invention are those of the general Formula I:

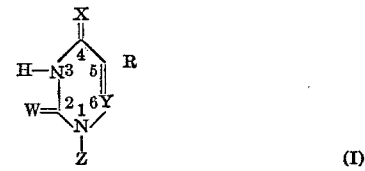

(I)

wherein R represents a hydrogen atom, an alkyl group of 1–4 carbon atoms, a halogen atom, a nitro or nitrile group; W is an oxygen or sulfur atom; X is an oxygen atom or the group =N—B in which B is a hydrogen atom or an alkyl, aryl, or aralkyl group; Y is a nitrogen atom or CH; and Z is a masked sugar residue.

The compounds produced by the process of this invention possess cytotoxic, antiviral, enzyme-inhibiting, immunosuppressive, anti-inflammatory, and anti-psoriatic properties.

Because the compounds of this invention can be employed in vitro as well as in vivo, they are especially useful, as disinfectants, e.g., in the sterilization of medical instruments and the like, as well as in cleansing solutions for cleaning woodwork, towels, linen, blankets, dishes and the like, to prevent spread of infection.

The final products of this invention can be employed in mixture with conventional pharmaceutical excipients. Carrier substances can be such organic or inorganic substances suitable for parenteral, enteral, or topical application, and which, of course, do not deleteriorly react with the novel compounds, such as, for example, water, vegetable oils, polyethylene glycols, gelatin, lactose, amylose, magnesium stearate, talc, vaseline, cholesterol, etc.

For parenteral application, particularly suitable are solutions, preferably oily or aqueous solutions, as well as suspensions, emulsions or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves or creams, which are, if desired, sterilized, or mixed with auxiliary agents, such as preservatives, stabilizers, or wetting agents, or salts for influencing the osmotic pressure, or with buffer substances.

The substance of this invention is generally administered to animals, including, but not limited to, mammals and avians, e.g., cattle, cats, dogs, and poultry.

A daily dosage comprises about 1 to 40 g. active compound of this invention on oral administration and a 5% greasy ointment on topical administration. In general, the mg./kg. ratio is preferably about 50 to 500 mg. per kg. of body weight. The dose can be administered once per day or in increments throughout the day. In any case, the final compounds of this invention can be administered in the same manner as the known drug 6-aza-uridine-2′,3′,5′-triacetate which has become easily accessible by the method described in this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the examples hereinafter, the bis-silyl compound employed as starting compound is the bis-trimethylsilyl ether of the heterocyclic compound named therein.

EXAMPLE 1

2′,3′,5′-tri-O-benzoyl-6-azauridine 2.5 g. (5 millimols) of 2,3,5-tri-O-benzoyl-1-O-acetyl-ribose was dissolved in 100 ml. of absolute dichloroethane and mixed with 6.25 millimols of the bis-silyl compound of 6-azauracil in 5.54 ml. of absolute benzene. After the addition of 0.4 ml. of $SnCl_4$ (3.6 millimols), the reaction mixture was stirred for 4 hours at room temperature. Then, the mixture was poured into 50 ml. of saturated $NaHCO_3$-solution, diluted with 50 ml. of dichloroethane, and sucked through kieselguhr. In place of dichloroethane, it is also possible to employ $CH_2Cl_2$, $CHCl_3$, or ethyl acetate. The clear organic phase was separated, dried over $Na_2SO_4$, and the solvent was removed under a vacuum. There remained 2.7 g. of an almost white, crystalline residue. After recrystallization from ethanol, 2.6 g. of white needles was obtained (92% of theory), having the melting point of 192–194° C.

EXAMPLE 2

2′,3′,5′-tri-O-benzoyl-5-ethyl-uridine 4.27 g. (8.4 millimols) of 1-acetyl-tribenzoyl-ribose, 3.0 g. (10.5 millimols) of the bis-silyl compound of 5-ethyl-uracil, and 0.71 ml. (6 millimols) of $SnCl_4$ in dichloroethane (150 ml. were agitated for 2 days at room temperature and worked up as set forth in Example 1. After recrystallization from ethanol, 4.7 g. (95% of theory) of white prisms is obtained, M.P. 159–160° C.

EXAMPLE 3

2′-deoxy-3′,5′-di-O-toluyl-6-azauridine 1.91 g. (5 millimols) of 1-O-methyl-2-deoxy-3,5-di-toluyl-ribose was dissolved in 40 ml. of absolute dichloroethane and mixed with 6.25 millimols of the bis-silyl compound of 6-azauracil in 5.54 ml. of absolute benzene. After the addition of 0.42 ml. of $SnCl_4$ in 30 ml. of absolute dichloroethane, the reaction mixture was stirred for 3 hours at 50° C. After cooling, the mixture was worked up as described in Example 1.

The residue (2.5 g. of an oil) was dissolved in a small amount of chloroform and the nucleoside was precipitated with pentane. The treatment was repeated with the nucleoside. The nucleoside was dissolved in ethanol, clarified with activated charcoal, and prepared for crystallization. The crystallized product obtained was 0.5 g. of white needles (20.5% of theory) having the melting point of 178–179° C.

EXAMPLE 4

2-thio-2′,3′,5′-tri-O-benzoyl-uridine 2.6 g. (5.16 millimols) of 1-O-acetyl-2,3,4-tri-O-benzoyl-ribose and 6.25 millimols of the bis-silyl compound of 2-thiouracil in 5.3 ml. of absolute benzene were dissolved in 70 ml. of absolute dichloroethane, mixed with 0.42 ml. of $SnCl_4$ (6.25 millimols) in 20 ml. of absolute dichloroethane, and stirred at room temperature for 24 hours (or at 50° C. for 5 hours). The mixture was worked up analogously to Example 1. After crystallizing the crude product from ethanol, 1.21 g. of white needles was obtained (41% of theory), M.P. 104–106° C.

EXAMPLE 5

2-thio-5-cyano-2′,3′,5′-tri-O-benzoyl-cytidine 2.6 g. (5.16 millimols) of 1-O-acetyl-2,3,5-tri-O-benzoyl-ribose was dissolved in 60 ml. of absolute dichloroethane and mixed with 6.25 millimols of the bis-silyl compound of 2-thio-5-cyano-cytosine in 10.8 ml. of absolute benzene. After the addition of 0.84 ml. (7.2 millimols) of $SnCl_4$, the reaction mixture was stirred for 24 hours at room temperature.

The working-up step was conducted according to Example 1. The residue was dissolved in $CHCl_3$ and the nucleoside was precipitated with pentane. After a reprecipitation, the nucleoside was dissolved in acetone, clarified with activated charcoal, and crystallized after the addition of cyclohexane. After recrystallization from benzene, 1.1 g. of fine-crystalline material was obtained (36.4% of theory), M.P. 130–135° C.

EXAMPLE 6

1-(2′-deoxy-3′,5′-di-O-p-nitrobenzoyl-ribofuranosyl)-5-iodo-uracil 6.1 g. (16 millimols) of the bis-silyl compound of 5-iodo-uracil was dissolved in 50 ml. of absolute dichloroethane and mixed with 7.12 g. (16 millimols) of 1-O-methyl-2-deoxy-3,5-di-p-nitrobenzoyl-ribose in 100 ml. of absolute dichloroethane. After the addition of 1.87 ml. (16 millimols) of $SnCl_4$ in 15 ml. of absolute dichloroethane, the reaction mixture was stirred overnight. After again mixing with 0.94 ml. (8 millimols) of $SnCl_4$ in 10 ml. of absolute ethylene chloride, the mixture was stirred for another 6 hours. Then, the mixture was diluted with 0.5 l. of $CH_2Cl_2$, shaken with 200 ml. of $NaHCO_3$ solution, and vacuum-filtered over kieselguhr. The kieselguhr was well washed out. The combined organic phases were dried over $Na_2SO_4$ and concentrated under a vacuum. During this step, the reaction product began to crystallize. After removing the solvent by evaporation, the sugar was boiled out with toluene. The nucleoside was recrystallized from dioxane/alcohol. Yield: 4.73 g. (45.3% of theory), M.P. 247–249° C.

EXAMPLE 7

2-thio-5-cyano-cytidine-2′-deoxy-3′,5′-ditoluylate 1.9 g. (5 millimols) of 1-O-methyl-2-deoxy-3,5-di-toluyl-ribose was dissolved in 70 ml. of absolute dichloroethane and mixed with 6.25 millimols of the bis-silyl compound of 2-thio-5-cyano-cytosine in 5.8 ml. of absolute benzene. After the addition of 0.42 ml. (3.6 millimols) of $SnCl_4$, the reaction mixture was stirred for 3 hours at room temperature. Then, the mixture was worked up as described in Example 1.

The residue was dissolved in ethyl acetate and clarified with activated charcoal. The nucleoside was freed of the sugar by reprecipitation with ethyl acetate/pentane and recrystallized from benzene/cyclohexane. Yield: 505 mg. of white needles (21% of theory), M.P. 138–140° C.

EXAMPLE 8

5-nitrouridine-tribenzoate 2.5 g. (5 millimols) of 1-acetyl-tribenzoyl-ribofuranose was dissolved in 100 ml. of absolute dichloroethane and mixed with 6.25 millimols of the bis-silyl compound of 5-nitrouracil in 3.16 ml. of absolute benzene. After the addition of 0.42 ml. (3.6 millimols) of $SnCl_4$, the reaction mixture was stirred for 2 hours at room temperature, and worked up as described in Example 1. After removal of the solvent, 2.85 g. of a white foam remained.

Crystallization from methylene chloride/hexane yielded 1.85 g. of white needles (61.5% of theory), M.P. 140° C.

EXAMPLE 9

2-thio-5-methyl-6-azauridine-tribenzoate 2.5 g. (4.96 millimols) of 1-acetyl-tribenzoyl-ribose, 6.25 millimols of the bis-silyl compound of 2-thio-6-azathymine in 7.9 ml. of absolute benzene, and 0.42 ml. (3.6 millimols) of $SnCl_4$ were stirred in 100 ml. of absolute dichloroethane for 3 hours, and then worked up as described in Example 1. The crude product was crystallized from ethanol, thus obtaining 2.41 g. of colorless platelets (82.6% of theory), M.P. 156–157° C.

EXAMPLE 10

1-(2'-deoxy-3',5'-di-O-p-toluyl-ribofuranosyl)-5-iodouracil 3.84 g. (10 millimols) of 1-O-methyl-2-deoxy-3,5-ditoluyl-ribose, 3.7 g. of the bis-silyl compound of 5-iodouracil, and 1.18 ml. (10 millimols) of $SnCl_4$ were dissolved in 75 ml. of absolute $CH_2Cl_2$. The reaction mixture was boiled under reflux for 1.5 hours, then cooled, and worked up as set forth in Example 1.

The residue was dissolved in ethyl acetate and clarified with activated charcoal. The sugar was extracted with pentane, and the nucleoside was crystallized from methanol. Yield: 1.6 g. (27.4% of theory), M.P. 193–194° C.

EXAMPLE 11

6-azauridine-triacetate 1.59 g. (5 millimols) of tetraacetyl ribose, 6.25 millimols of the bis-silyl compound of 6-azauracil in 5.54 ml. of absolute benzene, and 0.42 ml. (3.6 millimols) of $SnCl_4$ were stirred in 100 ml. of absolute dichloroethane overnight at room temperature, and then worked up as described in Example 1.

The crude product, 1.4 g. of an almost colorless oil, was crystallized from ethanol after the addition of a seed crystal. Yield: 968 mg. of colorless needles (52.2% of theory), M.P. 102–103° C.

EXAMPLE 12

5-methyl-6-azauridine-tribenzoate 2.5 g. (4.96 millimols) of 1-acetyl-2,3,5-tribenzoyl-ribose, 6.25 millimols of the bis-silyl compound of 6-azathymine in 3.36 ml. of absolute benzene, and 0.42 ml. (3.6 millimols) of $SnCl_4$ were dissolved in 100 ml. of absolute dichloroethane and stirred for 24 hours at room temperature. Then, the reaction mixture was worked up as set forth in Example 1. After removing the solvent by evaporation, 2.4 g. of a white, viscous mass remained. After recrystallization from ether/ethanol, 5-methyl-6-azauridine-tribenzoate, M.P. 132–133° C., was obtained. Yield: 2.2 g. (77% of theory).

EXAMPLE 13

1-(2',3',4',5'-tetraacetyl-glucopyranosyl)-6-azauracil 1.95 g. (5 millimols) of pentaacetyl glucose, 6.25 millimols of the bis-silyl compound of 6-azauracil in 3.95 ml. of absolute benzene, and 0.42 ml. (3.6 millimols) of $SnCl_4$ were stirred in 100 ml. of absolute dichloroethane for 5 hours at 60° C. After cooling, the reaction mixture was worked up as described in Example 1.

After the solvent had been distilled off, 1.59 g. of a yellowish oil remained. From the oil, by crystallization from ethanol, 1.26 g. (56.8% of theory) of colorless needles was obtained having the melting point of 206–207° C.

EXAMPLE 14

1-(2',3',5'tribenzyl-arabinofuranosyl)-6-azauracil 2.31 g. (5 millimols) of 1-acetyl-2,3,5-tribenzylarabinofuranose, 6.25 millimols of the bis-silyl compound of 6-azauracil in 3.95 ml. of absolute benzene, and 0.42 ml. (3.6 millimols) of $SnCl_4$ were dissolved in 100 ml. of absolute dichloroethane and stirred for 5 hours at room temperature. The reaction mixture was worked up as described in Example 1.

The oily residue (2.43 g.) was crystallized from methylene chloride/pentane, thus obtaining 1.4 g. (54.4% of theory) of long needles having a silky gloss, M.P. 123–124° C.

EXAMPLE 15

4-O-methyl-5-iodo-uridine-tribenzoate 2.5 g. (5 millimols) of 1-acetyl-tribenzoyl-ribose and 1.66 g. (6.25 millimols) of 2,4-dimethoxy-5-iodopyrimidine, as well as 0.84 ml. (7.2 millimols) of $SnCl_4$ were stirred for 4 hours in 100 ml. of absolute dichloroethane, and worked up as described in Example 1.

After distilling off the solvent, 3.3 g. of a yellow-colored oil remained.

Crystallization from ethanol yielded 2.31 g. (66.5% of theory) of white needles, M.P. 183–184° C.

EXAMPLE 16

The reaction of Example 1 was conducted in various solvents and with various catalysts. The following table provides an array of yields under different reaction conditions.

TABLE

| Solvent | Catalyst | Reaction conditions Time (hours) | Reaction conditions Temperature (° C.) | Yield in percent Crude | Yield in percent Crystalline |
|---|---|---|---|---|---|
| Cl—CH₂—CH₂—Cl | SnCl₄ | 3.6 m.mol. | 4 | 20 | 97 | 92 |
| CH₃CH | SnCl₄ | do | 4 | 20 | 97 | 82.5 |
| Dioxane | SnCl₄ | do | 4 | 101 | 77 | 57 |
| Tetrahydrofuran | SnCl₄ | do | 3 | 65 | 98 | 75 |
| Dimethylformamide | SnCl₄ | do | 4 | 153 | 77.5 | 68.5 |
| Benzene | SnCl₄ | do | 6 | 80 | 80.5 | 66 |
| Toluene | SnCl₄ | do | 6 | 111 | 86 | 66 |
| CS₂ | SnCl₄ | do | 4 | 46 | 87 | 67 |
| CCl₄ | SnCl₄ | do | 4 | 77 | 93 | 73 |
| Cl—CH₂—CH₂—Cl | ZnCl₂ | 980 mg. | 5 | 84 | 100 | 83 |
| Cl—CH₃—CH₂—Cl | TiCl₄ | 0.4 ml. | 30 | 20 | 65 | 40 |
| Chlorobenzene | AlCl₃ | 960 mg. | 6 | 132 | 63 | 40 |
| Tetrachloroethane | FeCl₃ | 1.18 grams | 5 | 146 | 44 | 25 |
| CS₂ | BF₃-Et₂O | 0.88 ml. | 6 | 46 | 70 | 60 |

EXAMPLE 17

1-(2',3',4',6'-tetra-O-acetyl-β-D-glucopyranosyl)-6-azauracil 4.11 g. (10 millimols) of acetobromoglucose was dissolved in 50 ml. of absolute ethylene chloride and mixed with 12.25 millimols of the bis-silyl compound of azauracil in 7.1 ml. of absolute benzene. After the addition of 0.84 ml. (7.2 millimols) of $SnCl_4$, the reaction mixture was stirred overnight at 60° C. After cooling, the mixture was diluted with 50 ml. of $CH_2Cl_2$ and shaken with 30 ml. of saturated $NaHCO_3$ solution. The organic phase was filtered over kieselguhr, and the kieselguhr was washed with 20 ml. of $CH_2Cl_2$. The combined organic phases were dried over Na₂SO₄, and the solvent was removed under a vacuum. The residue (4.6 g.) was crystallized from ethanol. Yield: 3.0 g. (67.7% of theory); M.P. 206–207° C.

EXAMPLE 18

2-(2'-deoxy-3',5'-di-p-toluyl-β-D-ribofuranosyl)-6-azauracil 27.7 millimols of the bis-silyl compound of 6-azauracil in 12.8 ml. of absolute benzene was dissolved in 200 ml. of absolute dichloroethane and mixed with 8.6 g. (22.2 millimols) of 3,5-di-toluyl-2-deoxyribofuranosyl chloride. Under ice cooling, there was next added, with stirring, 0.52 ml. (4.4 millimols) of SnCl₄ in 10 ml. of dichloroethane. The reaction mixture was stirred for 4 hours at 0° C. and worked up as described in Example 17. After clarifying with activated charcoal, 9.9 g. of a yellow oil remained (96% of theory). The product was purified by crystallization from ethanol; yield: 3.1 g. (30% of theory), M.P. 178–179° C.

By column chromatography, another 2.05 g. was isolated. Accordingly, the total yield was 5.15 g. (49.9% of theory).

EXAMPLE 19

1(2'-deoxy-3',5'-di-O-p-chlorobenzoyl-β-D-ribofuranosyl)-5-ethyl-uracil 49.4 millimols of the bis-silyl compound of 5-ethyl-uracil, dissolved in 33.6 ml. of absolute benzene, was added to a suspension of 17.0 g. of 2-deoxy-3,5-di-O-p-chlorobenzoylribofuranosyl chloride (39.5 millimols) in 300 ml. of absolute dichloroethane. Under stirring and ice cooling, 1.17 ml. (9.98 millimols) of SnCl₄ in 50 ml. of absolute dichloroethane was added dropwise. The reaction mixture was agitated for 3.5 hours at 0° C. and then worked up as described in Example 17. Yield of a crude product: 20.1 g.

From ethanol there crystallized 17.3 g. of an α,β-mixture (77.7%). By fractional crystallization from ethanol, the β-anomer was obtained in the pure form. Yield: 10.3 g. (46.3% of theory), M.P. 195–197° C.

EXAMPLE 20

1(2'-deoxy-3',5'-di-O-p-toluyl-β-D-ribofuranosyl)-5-ethyl-uracil 1.95 g. (5 millimols) of 2-deoxy-3,5-di-O-p-toluylribofuranosyl chloride and 6.25 millimols of the bis-silyl compound of 5-ethyl-uracil were dissolved in 50 ml. of absolute dichloroethane. Under stirring and ice cooling, 0.107 ml. (1.25 millimols) of SnCl₄ was added thereto.

The solution, which was at first turbid, soon became clear, and after stirring for 2 hours at 0° C., the reaction mixture was worked up as described in Example 17. Yield in crude product: 2.28 g.

By recrystallization from ethanol, 1.41 g. of the β-anomer was obtained (57.3% of theory), M.P. 197–198° C.

EXAMPLE 21

1(2',3',5'-tri-O-benzyl-β-D-arabinofuranosyl)-6-azauracil

The halogenose from 4.62 g. (11 millimols) of 2,3,5-tri-O-benzyl-arabinofuranose was dissolved in 100 ml. of absolute dichloroethane and mixed with 11 millimols of the bis-silyl compound of 6-azauracil in 7 ml. of absolute benzene. Under stirring and ice cooling, 0.42 ml. (3.6 millimols) of SnCl₄, dissolved in 2 ml. of absolute dichloroethane, was added thereto. The reaction mixture was stirred overnight at room temperature and worked up as described in Example 17. From methylene chloride/pentane, long white needles crystallized; yield: 2.40 g. (42.4% of theory), M.P. 123–124° C.

The preceding examples can be repeated with similar success by substituting the generally and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of pyrimidine nucleosides, the hydroxy groups on the sugar moiety of which are blocked, by reacting 1-O-carboxylic acid acyl, 1-O-alkyl or 1-halogen sugar whose hydroxy groups are blocked, with O-, S- or N-silyl or C-, S- or N-alkyl pyrimidine in the presence of a reaction catalyst, the improvement which consists essentially of employing a Friedel-Crafts catalyst as the reaction catalyst.

2. A process according to claim 1 wherein the starting sugar is selected from the group consisting of riboses, deoxyriboses, arabinoses and glucoses whose free hydroxy groups are blocked with a member of the group consisting of acetyl, benzoyl, p-chlorobenzoyl, p-nitrobenzoyl, p-toluyl and benzyl and the pyrimidine starting material is a compound of the formula

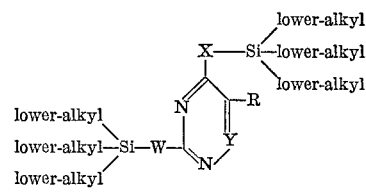

wherein W is O or S; X is O or NB wherein B is selected from the group consisting of H, alkyl of 1–4 carbon atoms, phenyl, and benzyl; Y is CH or N and R is selected from the group consisting of a hydrogen atom, alkyl of 1–4 carbon atoms, a halogen atom, a nitro group and a nitrile group.

3. A process according to claim 1 wherein the catalyst is tin tetrachloride and the pyrimidine starting material is a compound of the formula

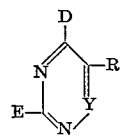

wherein R is selected from the group consisting of a hydrogen atom, alkyl of 1–4 carbon atoms, a halogen atom, a nitro group and a nitrile group; E is selected from the group consisting of silyl ether, alkyl ether, silyl thioether and alkyl thioether groups; D is selected from the group consisting of silyl ether and alkyl ether groups and groups of the formula N-trialkylsilyl-N-B or alkyl-N-B wherein B is selected from the group consisting of a hydrogen atom, alkyl of 1–4 carbon atoms, phenyl and benzyl; and Y is selected from the group consisting of a nitrogen atom and CH.

4. A process according to claim 2 wherein the catalyst is tin tetrachloride.

5. A process according to claim 4 wherein the catalyst is titanium tetrachloride and the pyrimidine starting material is a compound of the formula

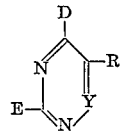

wherein R is selected from the group consisting of a hydrogen atom, alkyl of 1–4 carbon atoms, a halogen atom, a nitro group and a nitrile group; E is selected from the group consisting of silyl ether, alkyl ether, silyl thioether and alkyl thioether groups; D is selected from the group consisting of silyl ether and alkyl ether groups and groups of the formula N-trialkylsilyl-N-B or alkyl-N-B wherein B is selected from the group consisting of a hydrogen atom, alkyl of 1-4 carbon atoms, phenyl and benzyl; and Y is selected from the group consisting of a nitrogen atom and CH.

6. A process according to claim 2 wherein the catalyst is titanium tetrachloride.

7. A process according to claim 1 wherein the catalyst is zinc chloride and the pyrimidine starting material is a compound of the formula

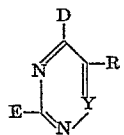

wherein R is selected from the group consisting of a hydrogen atom, alkyl of 1-4 carbon atoms, a halogen atom, a nitro group and a nitrile group; E is selected from the group consisting of silyl ether, alkyl ether, silyl thioether and alkyl thioether groups; D is selected from the group consisting of silyl ether and alkyl ether groups and groups of the formula N-trialkyl-silyl-N-B or alkyl-N-B wherein B is selected from the group consisting of a hydrogen atom, alkyl of 1-4 carbon atoms, phenyl and benzyl; and Y is selected from the group consisting of a nitrogen atom and CH.

8. A process according to claim 2 wherein the catalyst is zinc chloride.

9. A process according to claim 2 wherein the catalyst is boron trifluoride etherate.

10. A process according to claim 2 wherein the catalyst is $FeCl_3$.

11. A process according to claim 2 wherein the catalyst is $AlCl_3$.

References Cited
UNITED STATES PATENTS

| | | | |
|---|---|---|---|
| 3,023,205 | 2/1962 | Steyermark et al. | 260—211.5 |
| 3,208,997 | 9/1965 | Iwai et al. | 260—211.5 |
| 3,352,849 | 11/1967 | Shen et al. | 260—211.5 |
| 3,354,160 | 11/1967 | Duschinsky et al. | 260—211.5 |

LEWIS GOTTS, Primary Examiner

J. R. BROWN, Assistant Examiner

U.S. Cl. X.R.

424—180